May 24, 1938.   R. J. A. INGOUF   2,118,707
CONTINUOUS PROCESS FOR MAKING SHEETS OF MULTICELLULAR GLASS
Filed March 2, 1936   2 Sheets-Sheet 1
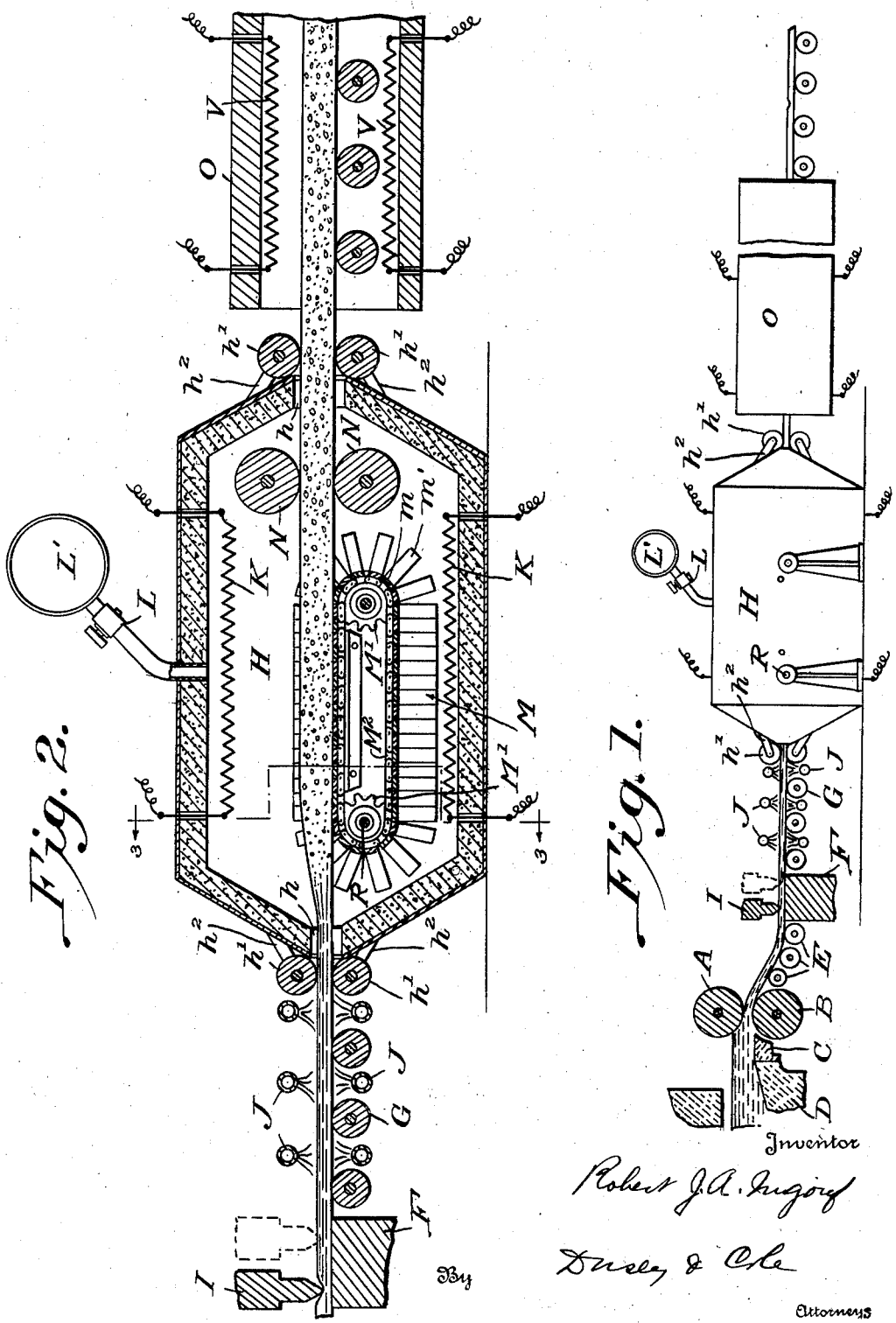

May 24, 1938. R. J. A. INGOUF 2,118,707
CONTINUOUS PROCESS FOR MAKING SHEETS OF MULTICELLULAR GLASS
Filed March 2, 1936 2 Sheets-Sheet 2
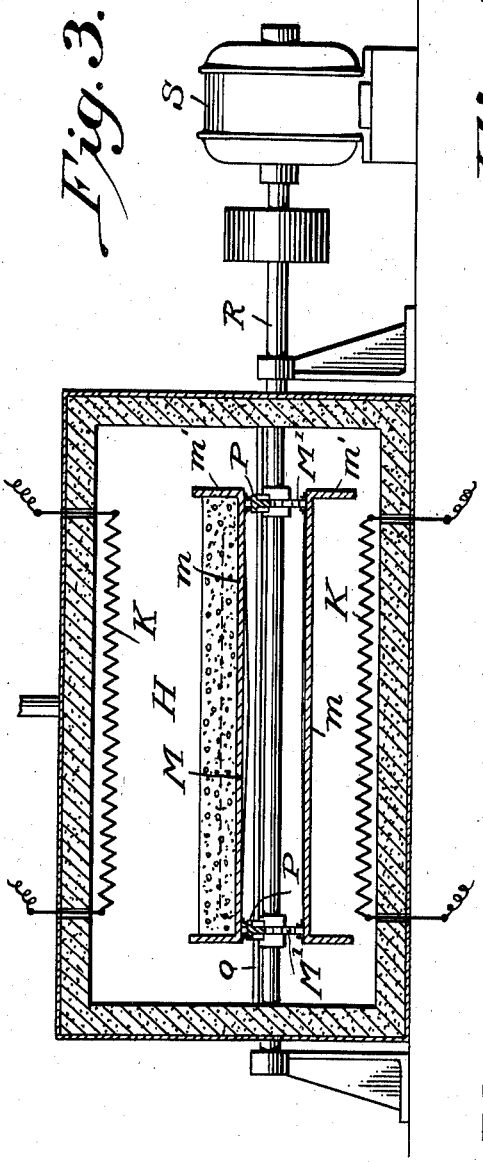
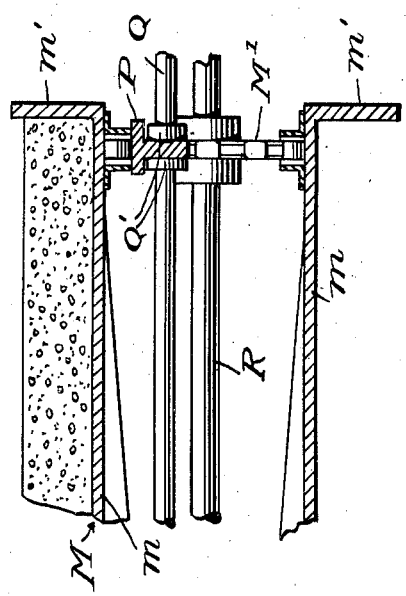
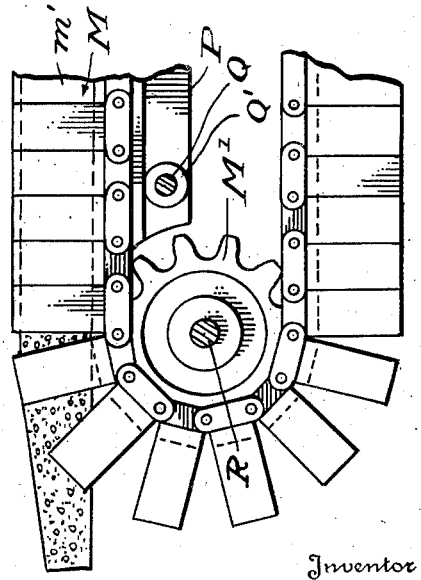
Inventor
Robert J. A. Ingouf
By Dudley O. Cole
Attorneys Patented May 24, 1938

2,118,707

UNITED STATES PATENT OFFICE 2,118,707

CONTINUOUS PROCESS FOR MAKING SHEETS OF MULTICELLULAR GLASS

Robert J. A. Ingouf, Kingsport, Tenn., assignor to Blue Ridge Glass Corporation, Kingsport, Tenn., a corporation of New York Application March 2, 1936, Serial No. 66,708

5 Claims. (Cl. 49—87)

This invention relates to the production of cellular glass sheets and consists in a process and apparatus for the production of such sheets by a continuous process in which after a ribbon of glass has been formed in any approved manner it is subjected, while at a proper temperature, to reduced air pressure to permit the formation of cavities therein as will be hereinafter more fully described and claimed.

Referring to the accompanying drawings in which corresponding parts are designated by corresponding marks of reference, Figure 1 is a side view partially in section of an apparatus embodying and adapted to carry out my invention.

Figure 2 is a sectional view, enlarged illustrating the formation of the sheets.

Figure 3 is a transverse section on the line 3—3 of Fig. 2.

Figure 4 is an enlarged side view illustrating the articulated link arrangement of the belt.

Figure 5 is a detail view showing in transverse section the mounting and support of the belt.

I provide suitable means for continuously forming a sheet of glass. In the drawings this takes the form of a pass between the rollers A and B located opposite the end of a forehearth C receiving molten glass from a suitable tank D. The batch melted in the tank may be of any one of the several batches known to product cellular glass on cooling under less than atmospheric pressure. An example of such a batch is that given in United States Patent No. 1,945,052 to Long.

The sheet produced at the pass is carried by the rollers E over an anvil F and thence by the rollers G to an expansion chamber H. Cooperating with the anvil is a suitable knife I located above the glass and adapted to be depressed to score the upper surface thereof. In the scoring movement the knife moves with the sheet from the position shown in full lines to the position shown in dotted lines in Figure 1.

Nozzles J are arranged to direct air on the upper and lower surfaces of the sheet between the anvil and the exhaust chamber H, and to thus suddenly cool the sheet to a temperature below its softening point.

The exhaust chamber H has controllable heating means such as for example electrical resistance elements K for heating the sheet and has subatmospheric pressure maintained therein by the exhaust duct L connected to a suitable vacuum line $L^1$. The ends of the chamber H are slotted as at $h$ to permit the passage of the sheet therethrough and a tight joint is maintained at the slots by the rollers $h^1$ bearing on the sheet. By preference, the rollers $h^1$ are mounted in arms $h^2$ projecting from the chamber H to afford floating bearings for the rollers so that they may rise and fall with the motion of the sheet.

Within the chamber the sheet is supported on a bed having side walls. In the drawings this bed takes the form of a travelling endless belt M running over rollers $M^1$ driven by a proper motor S through the transverse shaft R. The belt is composed of a series of articulated links $M^2$ having flat central portions $m$ and upstanding end flanges $m'$, as shown in Figures 4 and 5. Considering Figure 5 each side of the upper run of the endless belt travels upon or is supported by longitudinal tracks P which are maintained in proper position by the transverse shaft Q through the interposition of suitable collars $Q'$. In the chamber the sheet expands. After leaving the apron or belt M the expanded sheet passes between rollers N by which it is reduced to a desired thickness and its surface finished.

The sheet then passes through a lehr O, which may be of any approved construction the temperature of which is to be suitably controlled by appropriate adjustable means for example electric resistance elements V. Eventually, after annealing, the sheet is broken at the scored points.

In practicing my improved process by the apparatus above described, the furnace is charged with a suitable batch such as described in the said Long patent, which is melted under conditions such that the gases are not entirely liberated under the pressure in the furnace. Glass is then formed into a solid sheet. In order that its expansion to a cellular body may take place under controlled conditions, it is, after its formation into a sheet, rapidly chilled to below its softening point and in this condition is introduced into the chamber. Here it is submitted to controlled heat to raise its temperature to a desired extent above the softening point and to a controlled subatmospheric pressure. These two factors, together with the time during which the sheet is submitted to the temperature and vacuum, i. e., the speed of movement of the sheet, determine whether the sheet is more or less cellular. Under the conditions prevailing in the furnace, the sheet expands due to the liberation of gases within it, the lateral expansion being limited by the side walls of the apron. After such expansion the sheet is sized as to thickness by the rollers N.

Having thus described my invention, what I claim as new and desire to secure by United States Letters Patent, is:

1. The hereinbefore described method, which comprises melting a glass containing a substance which at subatmospheric pressure gives off vapors when heated, forming a continuous dense sheet from the molten glass, passing the sheet continuously through a zone of controlled heat and subatmospheric pressure to cause the sheet to assume a cellular state and annealing the sheet.

2. The hereinbefore described method, which comprises melting a glass containing a substance which at subatmospheric pressure gives off vapors when heated, forming a continuous dense sheet from the molten glass, scoring the sheet, passing the sheet continuously through a zone of controlled heat and subatmospheric pressure to cause the sheet to assume a cellular state and annealing the sheet.

3. The hereinbefore described method, which comprises melting a glass containing a substance which at subatmospheric pressure gives off vapors when heated, forming a continuous dense sheet from the molten glass, scoring the sheet, passing the sheet continuously through a zone of controlled heat and subatmospheric pressure to cause the sheet to assume a cellular state, separating the sheet at the scores, and annealing the sheet.

4. The hereinbefore described method, which comprises melting a glass containing a substance which at subatmospheric pressure gives off vapors when heated, forming a continuous dense sheet from the molten glass, passing the sheet continuously through a zone of controlled heat and subatmospheric pressure to cause the sheet to assume a cellular state, subjecting the expanded sheet to pressure to size the same, and annealing the sheet.

5. The hereinbefore described method, which comprises melting a glass containing a substance which at subatmospheric pressure gives off vapors when heated, forming a continuous dense sheet from the molten glass, rapidly cooling the sheet to a temperature below its softening point, continuously passing the sheet through a zone of heat and subatmospheric pressure to cause the sheet to assume a cellular condition, and annealing the sheet.

ROBERT J. A. INGOUF.